(12) United States Patent
Morovic et al.

(10) Patent No.: US 10,853,708 B2
(45) Date of Patent: Dec. 1, 2020

(54) COLOR CALIBRATION

(71) Applicant: Hewlett-Packard Development Company, L.P., Spring, TX (US)

(72) Inventors: Peter Morovic, Sant Cugat del Valles (ES); Jan Morovic, Essex (GB); Hector Gomez Minano, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/345,898

(22) PCT Filed: Feb. 10, 2017

(86) PCT No.: PCT/US2017/017343
§ 371 (c)(1),
(2) Date: Apr. 29, 2019

(87) PCT Pub. No.: WO2017/017343
PCT Pub. Date: Aug. 16, 2018

(65) Prior Publication Data
US 2019/0279054 A1    Sep. 12, 2019

(51) Int. Cl.
*G06K 15/02* (2006.01)
*H04N 1/00* (2006.01)
(Continued)

(52) U.S. Cl.
CPC ....... *G06K 15/027* (2013.01); *G06K 15/1878* (2013.01); *H04N 1/00* (2013.01);
(Continued)

(58) Field of Classification Search
None
See application file for complete search history.

(56) References Cited

U.S. PATENT DOCUMENTS 5,557,712 A * 9/1996 Guay ............... H04N 1/6019
345/611
5,594,557 A   1/1997 Rolleston et al.
(Continued)

OTHER PUBLICATIONS

International Search Report and Written Opinion for International Application No. dated Sep. 28, 2017, 7 pages.
(Continued)

*Primary Examiner* — Beniyam Menberu
(74) *Attorney, Agent, or Firm* — HP Inc. Patent Department

(57) ABSTRACT

A method of calibrating a printing system. Data defining a color mapping that maps a first set of n-dimensional color Input points to a corresponding second set of n-dimensional color output points, the color mapping representing a measured behavior of the printing system, is obtained. A smoothed mapping function of color input points that satisfies a predetermined optimization condition based on a mapping error between the smoothed mapping function and the color mapping is determined. The mapping error is a function of individual errors between outputs of the smoothed mapping function as applied to respective color input points in the first set of color input points and corresponding color output points from the second set of color output points as mapped from the respective color input points by the color mapping. The smoothed mapping function is used to calibrate the printing system.

12 Claims, 6 Drawing Sheets

(51) Int. Cl.
*H04N 1/60* (2006.01)
*G06F 3/12* (2006.01)

(52) U.S. Cl.
CPC ....... *H04N 1/0009* (2013.01); *H04N 1/00015* (2013.01); *H04N 1/00023* (2013.01); *H04N 1/00029* (2013.01); *H04N 1/00031* (2013.01); *H04N 1/00045* (2013.01); *H04N 1/00053* (2013.01); *H04N 1/00063* (2013.01); *H04N 1/00087* (2013.01); *H04N 1/6033* (2013.01)

(56) References Cited

U.S. PATENT DOCUMENTS

| | | | |
|---|---|---|---|
| 5,739,927 A * | 4/1998 | Balasubramanian | H04N 1/6033 358/518 |
| 6,522,427 B1 | 2/2003 | Bhattacharjya et al. | |
| 6,577,774 B1 * | 6/2003 | Asada | H04N 1/4092 382/209 |
| 7,136,523 B2 | 11/2006 | Fukao et al. | |
| 7,525,684 B2 | 4/2009 | Majewicz | |
| 7,571,974 B2 | 8/2009 | Cowan et al. | |
| 8,503,775 B2 | 8/2013 | Ishii et al. | |
| 8,531,549 B1 | 9/2013 | Linzer et al. | |
| 9,036,209 B2 | 5/2015 | Holub | |
| 2003/0081831 A1 * | 5/2003 | Fukao | H04N 1/6025 382/167 |
| 2004/0091148 A1 * | 5/2004 | Fukao | H04N 1/6019 382/167 |
| 2006/0072128 A1 * | 4/2006 | Ng | H04N 1/58 358/1.9 |
| 2011/0063631 A1 * | 3/2011 | Liu | H04N 1/6033 358/1.9 |

OTHER PUBLICATIONS

Xu, C. "vol. Estimation and Image Quality Assessment with Application in Dietary Assessment and Evaluation", Purdue University, May 2014, 174 pages.

* cited by examiner

COLOR CALIBRATION

BACKGROUND

A printing apparatus commonly includes a plurality of different color inks or colorants. By overprinting images for each of the inks or colorants, an image with a range of different colors can be printed. An example printing pipeline may be calibrated so that printed colors are similar to or match desired colors, such as those defined in a digital format. However, certain calibration methods may not be sufficiently reliable. The printed image may therefore be a different color than desired.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
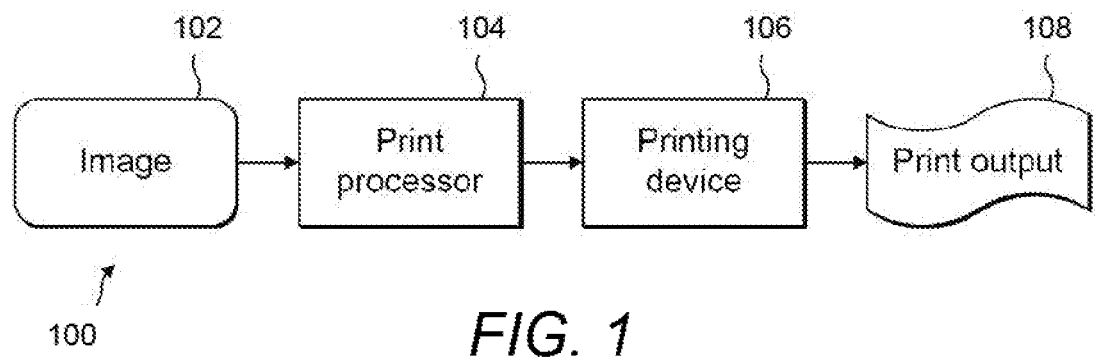
FIG. 1 is a schematic illustration of the use of a printing system for printing a print output according to examples.

In the following description, for the purpose of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to color calibration of a printing system. Color calibration may for example be used to adjust the color response of the printing system to more accurately correspond to a desired color to be printed. Although "color" is a concept that is understood intuitively by human beings, it can be represented in a large variety of ways. For example, in one case, a color as observed visually by an observer may be related to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modeled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of printing fluid, colorant or ink, e.g. for a printing system; the International Commission on Illumination (CIE) 1931 XYZ color space, in which three variables ('X', 'Y' and 'Z' or tristimulus values) are used to model a color; the CIE 1976 (L*, a*, b*—CIELAB or 'LAB') color space, in which three variables represent lightness ('L') and opposing color dimensions ('a' and 'b'); and the Yu'v' color space, in which three variables represent the luminance ('Y') and two chrominance dimensions (u' and v').

Examples described herein relate to color calibration for a printing system. The color calibration may involve calibration of a color mapping within a color space, for example to adjust or improve a pre-calculated color mapping within the color space. Further examples relate to a diagnostic method in which errors in a color calibration can be identified. The printing system can then be modified appropriately to compensate for the errors. This may result in a more predictable printing system that minimizes color artifacts in a printed output and wherein colors of a print output are a good match for digitally-defined input colors.

FIG. 1 shows schematically a printing system 100 that may be used for printing one or more colorants to produce a print output. Examples of colorants include inks, dyes, pigments, paints, toners and powders. For example, the printing system 100 may be used with a plurality of base color inks. Each base color ink may correspond with a different color coordinate or dimension of a given color space such as red, green and blue for the RGB color space or cyan, magenta, yellow and black for the CMYK color space, although other base color inks are possible. For example, the base color inks may correspond with other color inks, for example depending on the intended use of the printing system and the expected colors of the print outputs to be printed using the printing system. Print job data corresponding to an image 102 to be printed is sent to a print processor 104. For example, an image 102 may be defined via a raster image file or a vector image file. In a raster image file, the image 102 may be defined by a plurality of pixels, wherein each pixel comprises a series of digital values representing a color within a given color model. When an 8-bit RGB model is used, each pixel may comprise three 8-bit values representing quantities from 0 to 255. In a vector image file, the image 102 may be defined by a series of geometric shapes, wherein these shapes have an associated color value. For example, a square may be defined as extending from pixel co-ordinate A to pixel co-ordinate B and have an associated 8-bit RGB value. The term image 102 is not limited to literal digital images and may data that includes text and typography definitions, as well as other visual information to be printed. The print processor 104 processes the print job data. The print processor 104 then outputs print control data that is communicated to a printing device 106. In certain cases, this may comprise rasterizing a vector image file and/or converting from a co-ordinate system of the print input to a co-ordinate system associated with a print mechanism of the printing device 106. The printing device 106 in this example is arranged to use a plurality of base color inks to produce a print output 108 on a substrate. The substrate may be any two or three dimensional substrate. Similarly, the printing system 100 may comprise a two-dimensional or three-dimensional printing system. In the latter case, the three-dimensional printing system may be arranged to print on a bed of build material, and the image 102 may comprise a three-dimensional object definition. The three-dimensional object definition may comprise a series of voxels, wherein each voxel has an associated color value. The printing system 100 and the printing device 106 according to examples are described in further detail below with reference to FIGS. 12 and 13.

The print output 108 includes portions of the base color inks that are deposited onto the substrate by way of the printing device 106. In the example of FIG. 1, an area of the print output 108 may, depending on the print job data representing the image 102, include a colorant or ink overprint, in that a portion of a first base color ink may be overprinted with a portion of at least a second base color ink. This overprint may act to "mix" the colors, i.e. generate a measurably different visual impression from the individual base inks. The print control data for controlling the printing of the print output 108 by the printing device 106 has defined values for depositions with each combination of the base color inks. In certain cases, the print control data may include a distribution vector that specifies a distribution of base color ink depositions, e.g. a probability distribution for each base color ink and/or base color ink combination for a pixel of a print image or, in other words, an area coverage vector for a set of base color ink combinations or overprints. The print control data may be processed via a halftoning stage such as matrix-selector-based PARAWACS (Parallel Random Area Weighted Area Coverage Selection) techniques or techniques based on error diffusion.

Figure 2:
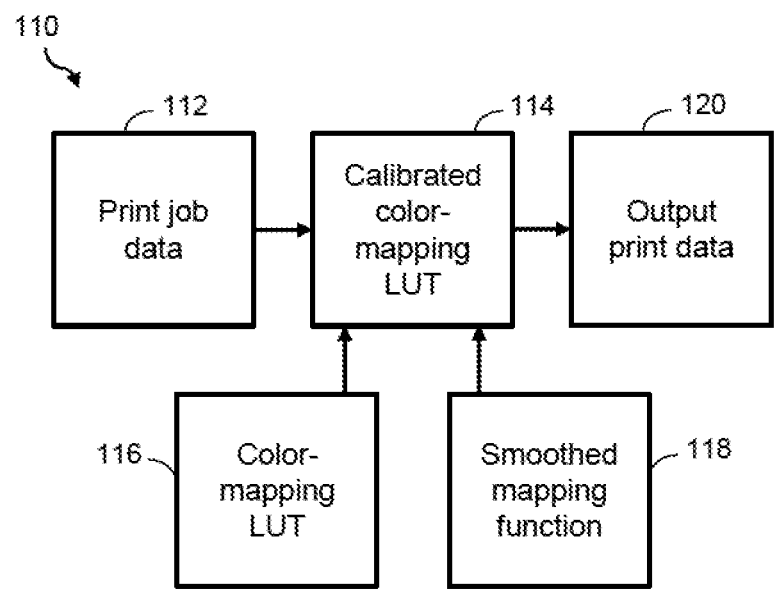
FIG. 2 is a schematic diagram of an image processing pipeline according to examples.

FIG. 2 shows an example of an image processing pipeline 110 for a printing system such as the printing systems described with reference to FIGS. 1, 12 and 13. An image processing pipeline may be defined as a number of components that are used to digitally process input image data from an image source for rendering by an image renderer, e.g. a printing device. These components may comprise hardware components or other machine readable components or instructions, such as image processing functions, digital signal processors, programmed Field Programmable Gate Arrays, Application-Specific Integrated Circuits and the like. Those skilled in the art will understand that image processing functions may be applied in either machine readable instructions and/or suitably programmed or configured hardware to have the same effect. The image processing pipeline 110 receives print job data 112. The print job data 112 may include input color data defined within an input color space. The input color space may be a device-dependent color space. For example, an output color with a common value in the device-dependent color space may have a different perceived color when input to different printing systems. The RGB and CMYK color spaces are examples of device-dependent color spaces. For example, where the input color data is defined within the RGB or CMYK color spaces, the input color data may be in the form of pixel representations in the RGB or CMYK color space respectively, e.g. such that each pixel of the image has a corresponding set of RGB or CMYK values. As such, in certain cases, print job data 112 may comprise image data such as an image file, with defined digital values for each of a plurality of color dimensions in the input color space (e.g. three values between 0 and 255 for an 8-bit RGB definition).

The print job data 112 is passed to a calibrated color-mapping look-up table 114. The calibrated color-mapping look-up table 114 is obtained based on a color-mapping look-up table 116 and a smoothed mapping function 118, as described further below with reference to FIG. 3. The calibrated color-mapping look-up table 114 in this example maps the input color data from the input color space to an output color space. The output color space may be a device-independent color space such as the Neugebauer primary area coverage (NPac) space. In this way, the colors printed after color mapping using the calibrated color-mapping look-up table 114 will be visually the same regardless of the printing device they are printed by.

The NPac space may be deemed a print control space that controls a color output of an imaging device. It may also be considered, in certain cases, to correspond to a color space. An NPac vector in the NPac space represents a statistical distribution of one or more Neugebauer Primary (NP) vectors over an area of a halftone. In a simple binary (bi-level, i.e. two drop state: "drop" or "no drop") printer, an NP is one of $2^k$ combinations of k inks within the printing system. For example, if a printing device uses RGB inks there can be eight NPs. These NPs relate to the following: R, G, B, R+G, R+B, G+B, R+G+B, and W (white or blank indicating an absence of ink). As may be seen, an NP may comprise an overprint of two available inks, such as a drop of red on a drop of green (for a bi-level printer) in a common addressable print area (e.g. a printable "pixel"). Other examples may also incorporate multi-level printers, e.g. where print heads are able to deposit N drop levels, for example via multiple print passes or print-bars; in this case an NP may include one of $N^k$ combinations of k inks within the printing system. An NPac space provides a large number of metamers. Metamerism is the existence of a multitude of combinations of reflectance and emission properties that result in the same perceived color for a fixed illuminant and observer.

Each NPac vector may therefore define the probability distribution for one or more colorant or ink combinations for each pixel in the halftone (e.g. a likelihood that a particular colorant or ink combination is to be placed at each pixel location in the halftone). In this manner, a given NPac vector defines a set of halftone parameters that can be used in the halftoning process to map a color to one or more NP vectors to be statistically distributed over the plurality of pixels for a halftone. Moreover, the statistical distribution of NPs to pixels in the halftone serves to control the colorimetry and other print characteristics of the halftone.

Spatial distribution of the NPs according to the probability distribution specified in the NPac vector may be performed using any suitable halftoning methods. In this respect, examples of suitable halftoning methods include matrix-selector-based PARAWACS (Parallel Random Area Weighted Area Coverage Selection) techniques and techniques based on error diffusion. An example of a printing system that uses area coverage representations for halftone generation is a Halftone Area Neugebauer Separation (HANS) pipeline. The output of the halftoning process may be print control data for each of a plurality of print resolution pixels, wherein each pixel has an associated base color ink value. In a bi-level printer this may indicate whether an ink-depositing mechanism, such as an inkjet printhead, is to deposit a drop of a given base color ink at a particular location. The dimensions of the output print data may depend on the properties of the printing device being used, e.g. its addressable output resolution.

Thus, an output color may be defined by an NPac value that specifies a particular area coverage of a particular colorant or ink combination. In the image processing pipeline 110 of FIG. 2, a halftone image on a substrate includes a plurality of pixels or dots, the spatial density of the pixels or dots being defined in NPac space. The image processing pipeline 110 therefore controls the colorimetry of an area of the image. For example, the halftoning process may simply implement the area coverages as defined in the NPac space, e.g. convert the probabilistic NPac vectors to realised print instructions for drops of colorant.

In the example of FIG. 2, the calibrated color-mapping look-up table 114 is based on an initial color mapping in the input color space, which in this example is the RGB color space, and a subsequent color mapping from the RGB color space to an NPac vector in the NPac space. For example, the mapping from the RGB color space to the NPac space may involve a color separation process in which device-dependent RGB values are converted to device-independent NPac vectors. The mapping may subsequently involve a halftoning process such as those described above, by which the spatial distribution of NPs to be printed by the printing system is determined.

In this example, the two mappings (i.e. from a first set of color input points in the RGB color space to a second set of color output points in the RGB color space, and subsequently from the second set of color output points in the RGB color space to a third set of color output points in the NPac space) are concatenated in the calibrated color-mapping look-up table 114. Thus, each input RGB value may have a corresponding output NPac vector in the calibrated color-mapping look-up table 114, although in some cases multiple different RGB values may be mapped to the same output NPac vector or vice versa. However, in other examples, the calibrated color-mapping look-up table 114 may involve two separate tables: one for an RGB to RGB mapping and one for an RGB to NPac mapping. Alternatively, one calibrated color-mapping look-up table 114 may be used for a mapping within a device-dependent color space, such as the RGB color space. A conversion from the device-dependent color space may be carried out without the use of a look-up table or may be omitted entirely, for example where the initial color mapping is in a device-independent color space.

The output of the calibrated color-mapping look-up table 114 in the example of FIG. 2 is output print data 120, which can be used to instruct the printing system to print the image based on the print job data 112. In this example, as explained above, the output print data 120 is in the form of an NPac vector, which is in a device-independent color space (the NPac space). However, in other examples, the output print data may be in a device-dependent color space such as the RGB color space. In such cases, the printing system may be instructed to produce a print output based on the output print data or the output print data may be converted to a device-independent color space before being used to instruct the printing system to produce a print output.

Figure 3:
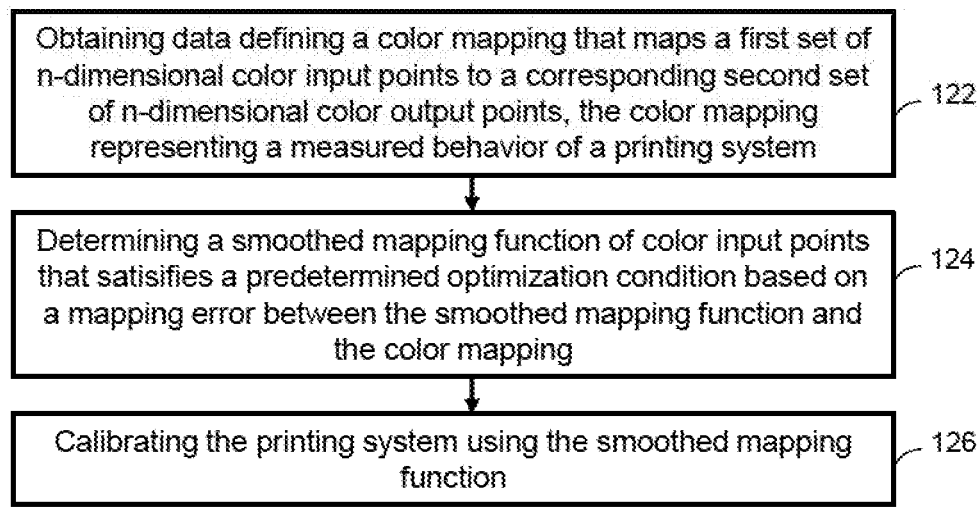
FIG. 3 is a flow diagram illustrating a method of calibrating a printing system according to examples.
Figure 12:
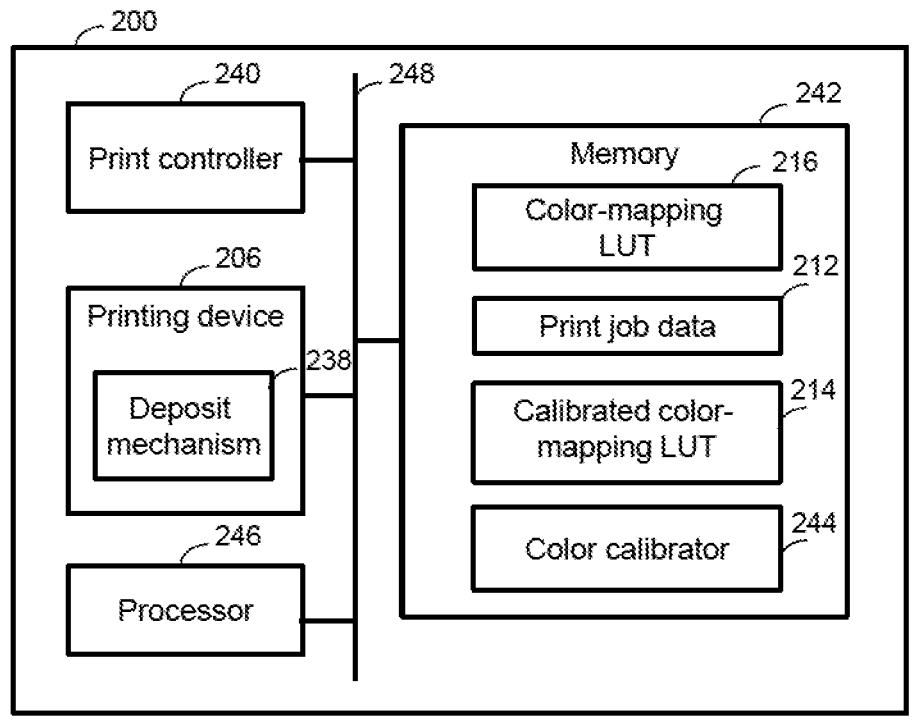
FIG. 12 is a schematic illustration showing a printing system according to examples.
Figure 13:
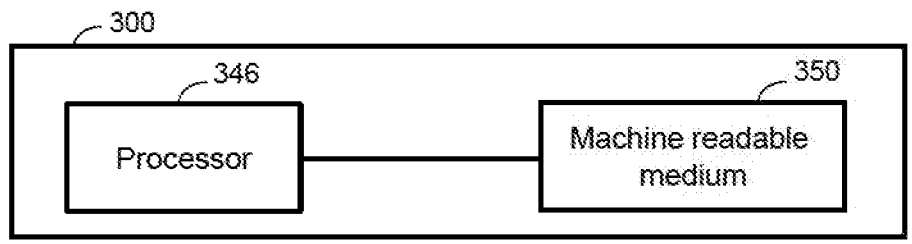
FIG. 13 is a schematic diagram of a printing system according to further examples.

An example method of calibrating a printing system such as that of FIGS. 1, 12 and 13 is illustrated in the flow diagram of FIG. 3. This method may involve the generation of a calibrated color-mapping look-up table such as that described with reference to FIG. 2, as will be explained further below.

The method of FIG. 3 includes, at block 122, obtaining data defining a color mapping that maps a first set of n-dimensional color input points to a corresponding second set of n-dimensional color output points. The location of the color input points and the color output points may be considered to correspond to respective color values. The color mapping may be represented by a color-mapping look-up table such as the color-mapping look-up table 116 of FIG. 2. The first set of n-dimensional color input points may be in the same color space as the second set of n-dimensional color output points. For example, both may be in the RGB, CMYK or NPac color spaces.

Figure 4:
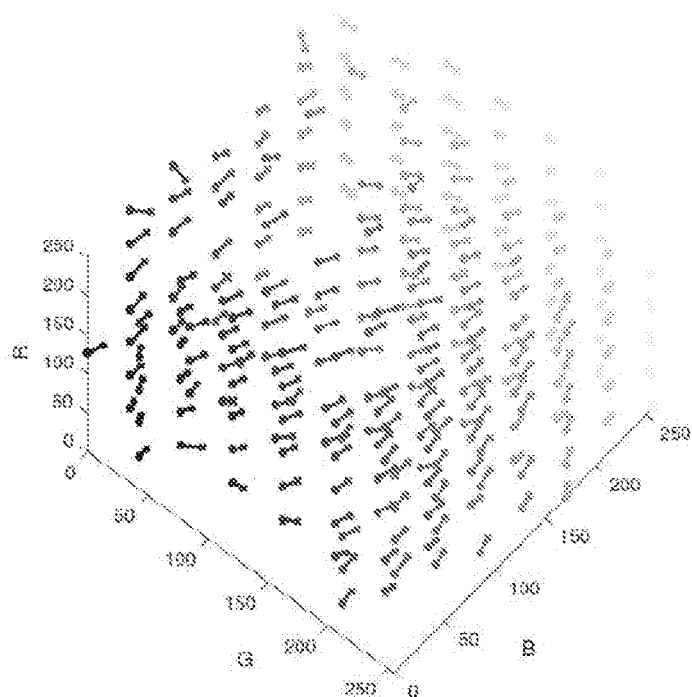
FIG. 4 is a visualization of an example color mapping.

A visualization of an example color mapping is illustrated in FIG. 4. The color mapping of FIG. 4 is in the RGB color space. Thus, the color input and output points may be represented by locations in the RGB color space. Each color (red, green and blue) corresponds with a different dimension of the color space, with the value of each dimension corresponding with a magnitude of the corresponding color. The color mapping may thus be defined by a plurality of pairs of co-ordinates mapping a color input value to a particular color output value, e.g. $(R_I, G_I, B_I) \Rightarrow (R_O, G_O, B_O)$. These pairs of co-ordinates may be stored as a look-up table. They may be, in whole or in part, loaded into a computer memory to implement the color mapping. As such, the color mapping may be applied by matching a supplied color value, e.g. as associated with the color of a pixel in an image file to be printed, with a color input value in the list of look-up table entries and then retrieving a corresponding color output value. In certain cases, a color mapping may not comprise entries for all possible co-ordinates in the color space; in these cases, a limited number of entries (sometimes referred to as "nodes") may be stored, e.g. defining visually significant color points, and then values between these entries may be interpolated. In FIG. 4, the color input points are represented by filled-in circles and the color output points by crosses. The color mapping that maps or transforms a color input point to a corresponding color output point is visualized by a line in the RGB color space that joins the color input point with the corresponding color output point.

The color mapping in this example represents a measured behavior of the printing system. For example, the color mapping may be pre-calculated or pre-generated based on measurements of the printing system. Alternatively, the color mapping may be determined or calculated in response to initiating a calibration process for the printing system.

Various different methods may be used to obtain the color mapping. For example, the color mapping may be a closed loop color calibration. Such a calibration may be obtained by printing a respective ink sample for each base color ink and comparing the printed ink samples with reference data. The reference data for example represents corresponding ink samples printed using the printing system under reference conditions, which may correspond with expected printing conditions. For example, the reference data may be obtained under reference conditions in a laboratory, in which properties of the printing system such as the drop weights of ink printed by the printer pens or nozzles of the printing system are measured, or under declared reference conditions of the printing system, for example as indicated by a user of the system.

Properties of the printed ink samples may be compared with the corresponding properties of the reference ink samples to obtain the color mapping for the printing system. The properties compared may for example be the ink drop weight for a particular ink coverage. The reference drop weight for the reference ink samples may be considered to be nominal drop weights, which may be an expected or desired drop weight for printing. However, the drop weight for ink printed by a particular printing system may differ from the reference drop weight. If this is the case, parameters of the printing system may be adjusted to appropriately alter the drop weight, based on the color mapping. For example, the color mapping may represent an extent by which certain colors in a color space, such as the RGB color space, are to be changed to more closely replicate printed outputs that would be obtained using the printing system under the reference conditions. For example, the color mapping may represent an amount or proportion by which drop weights for different base color inks are to be altered to more accurately match the reference data.

In other examples, the color mapping may be a multi-dimensional color mapping rather than a one-dimensional color mapping based on individual base color inks. For example, where the reference data is in the RGB color space, the color mapping may be three-dimensional and may map points in the 3-dimensional RGB color space to corresponding points in the 3-dimensional RGB color space. Such a multi-dimensional color mapping may be obtained similarly to the one-dimensional color mapping described above but by printing ink samples in RGB color space, for example by printing and measuring properties of different combinations of inks, each corresponding to a respective point in the RGB color space, rather than by printing and measuring individual base color inks.

In practice, a color mapping may be obtained by printing small test areas of defined color values (e.g. n different color square representing different RGB values) on a particular printing device and comparing a measurement of the print output with measurements of the same test areas printed under reference conditions (e.g. controlled or measured conditions) with a reference printing device (e.g. a printing device with recorded properties and/or configuration settings). The measurement may comprise obtaining output values for each test area from a color measurement device, such as, amongst others, a tristimulus colorimeter, a spectrocolorimeter or a spectrophotometer. The output from such a device may be in a desired color space (e.g. RGB) or may be converted to the desired space using conversion equations in the art. This process may generate a set of measurements each comprising an input color value, an output color value for the print system (e.g. as measured from a test sample) and a reference color value (e.g. a measured value for a test sample printed under reference conditions using the same input color value). This set of measurements may represent an actual and a desired output for a particular input color value. The set of measurements may then be processed such that input color values for the printing system are modified by the color mapping to result in a color output that coincides with the desired output. For example, an input color value $C_{I1}$ may have an associated measured print output color value for the printing system of $C_{M1}$ and a reference output color value of $C_{R1}$ (e.g. as printed under factory settings). A search may then be performed within the set of measurements for a measured print output color value, $C_{MM}$, that matches (or is closest to, e.g. has a smallest color error with) the reference output color value, $C_{R1}$. The input color value $C_{IM}$ associated with the matching print output color value, $C_{MM}$ (i.e. the input color value that is used to instruct the printing of the test sample from which $C_{MM}$ is measured) is then retrieved. The pairing of input color value $C_{I1}$ to input color value $C_{IM}$ may then be used as a node in the color mapping (e.g. as illustrated in FIG. 4). For example, input image data with an input color value of $C_{I1}$ is preprocessed to map the color value to $C_{IM}$ so that the reference output color $C_{R1}$ (which is equal or close to $C_{MM}$) instead of $C_{M1}$ is printed. In this manner a particular printing system is calibrated to behave in a similar manner to a reference printing system. The color mapping is then arranged to map color input values $C_{Ii}$ to color output values $C_{Oi}$.

The accuracy of the calibration of the printing system may depend on the accuracy of the measurements of the properties of the printed ink samples. In other words, if there are errors in these measurements, for example due to noise or other artifacts, the accuracy of the calibration may be reduced. Furthermore, the quality of the printed image may depend on the smoothness of the color mapping, both locally and globally. For example, if the color mapping is locally smooth, for example with smaller changes for lighter colors and larger changes for darker colors, undesirable artifacts in the printed image may be avoided. In certain cases, a color calibration using a color mapping is one operation out of many in an image processing pipeline. Discontinuities within a color mapping may thus lead to unpredictable and chaotic behavior within the image processing pipeline as additional operations are applied.

However, the color mapping obtained using the methods described above may not be particularly smooth. For example, localized regions in the n-dimensional color space may be changed considerably more than other localized regions, which can adversely affect the quality of the print output.

To compensate for this, a method according to examples may involve a post-processing operation based on the color mapping. This post-processing operation in examples, such as that of block 124 FIG. 3, involves the generation of a smoothed mapping function based on the color mapping. This smoothed mapping function may be used for calibration of the printing system, e.g. to map input image data instead of the color mapping, as will be described further below.

The smoothed mapping function of color input points is determined at block 124 of FIG. 3. The determination of the smoothed mapping function involves determining a smoothed mapping function of color input points that satisfies a predetermined optimization condition based on a mapping error between the smoothed mapping function and the color mapping. The smoothed mapping function may be selected to provide a smooth mapping between color input points and respective color output points, for example both locally and globally. For example, the smoothed mapping function may be chosen such that the color mapping changes steadily, slowly or by a small amount locally, with systematic changes in the color mapping at a global scale.

Various functions are suitable for use as a smoothed mapping function. For example, the smoothed mapping function may be a polynomial function such as a second order polynomial function. This may allow some non-linearity to be represented by the smoothed mapping function while maintaining smoothness. Other suitable functions include radial basis functions. In further examples, principal component analysis (PCA) may be used to obtain the smoothed mapping function, for example by extracting smooth components based on a PCA function.

The mapping error is, for example, a function of individual errors between outputs of the smoothed mapping function as applied to respective color input points in the first set of color input points and corresponding color output points from the second set of color output points as mapped from the respective color input points by the color mapping. The predetermined optimization condition in examples is satisfied by smoothed mapping function which has a mapping error with a magnitude less than a predetermined magnitude or by a minimization of the mapping error. For example, the determining the smoothed mapping function may include at least one of interpolation or regression to minimize or otherwise tune the mapping error. For example, a least squares regression function may be used to obtain the smoothed mapping function that minimizes the mapping error. In examples in which PCA is used, least squares regression may be performed in the PCA domain. Other interpolation or regression functions are possible though, such as cubic spline interpolation. In yet further examples, a machine learning function such as a neural network may be used to extract the smoothed mapping function that satisfies the predetermined optimization condition.

Block 126 of the method of FIG. 3 includes calibrating the printing system using the smoothed mapping function. In this example, the smoothed mapping function is used in place of the color mapping to calibrate the printing system. In other words, the smoothed mapping function is used for the calibration and the color mapping is not used for the calibration of the printing system. The smoothed mapping function may be used to generate a calibrated color-mapping look-up table such as that described with reference to FIG. 1. For example, entries of the calibrated color-mapping look-up table may be used to associate a color input point with a color output point corresponding to the output of the smoothed mapping function as applied to the color input point. The smoothed mapping function may thus be applied as a preprocessing operation in an image or print processing pipeline. The calibrated color-mapping look-up table may then be used to calibrate the printing system rather than using the smoothed mapping function directly. However, as will be appreciated, in other examples the smoothed mapping function itself may be used for the calibration of the printing system.

Figure 5:
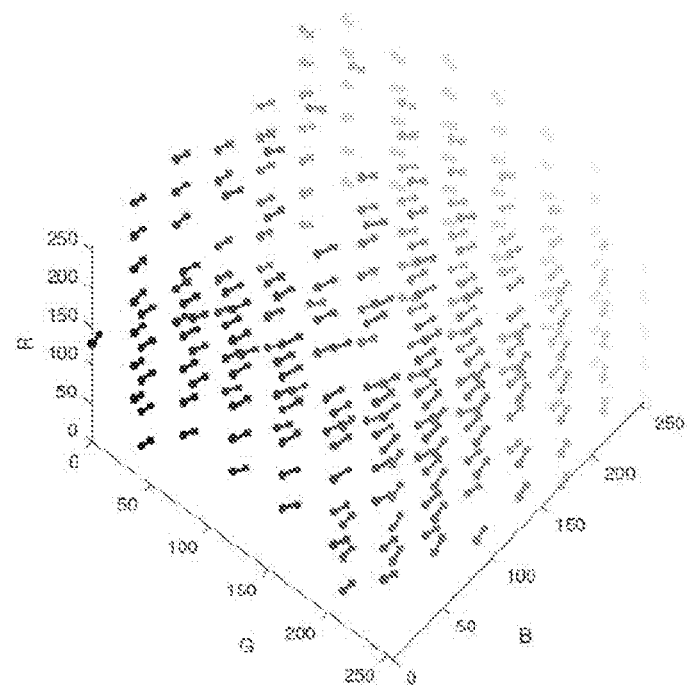
FIG. 5 is a visualization of an example smoothed mapping function determined using the color mapping of FIG. 4.

FIG. 5 shows an example of the smoothed mapping function obtained using the method of FIG. 3 with the color mapping of FIG. 4 as an input. By comparing FIG. 4 and FIG. 5, it can be seen that the mapping is smoother in local regions of the color space in FIG. 5 than in FIG. 4. For example, in FIG. 4, the lines representing the mapping between the color input and output points have greater variation in direction and greater variation in length in local volumes of the color space than the lines in FIG. 5.

Figure 6:
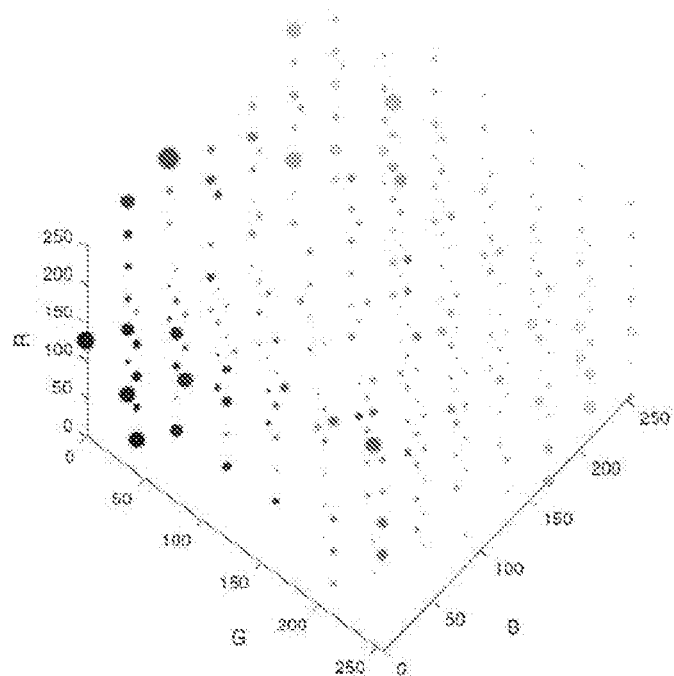
FIG. 6 is a visualization of individual errors between the example color mapping of FIG. 4 and the example smoothed mapping function of FIG. 5.

FIG. 6 illustrates the individual errors calculated during the determination of the smoothed mapping function of FIG. 5. Each individual error is represented by a circular point in FIG. 6, with the location of each point corresponding with a particular color input point and output point pair. The diameter of each circular point in FIG. 6 is indicative of the magnitude of the error represented by the respective point; the larger the diameter, the larger the magnitude of the error. As may be seen, there are local volumes of the color space where errors are larger than average (as indicated by the larger diameter circles) and errors of different sizes are distributed across the whole volume of the color space. In the example of FIG. 6, darker colors and blues tend to result in larger errors.

Figure 7:
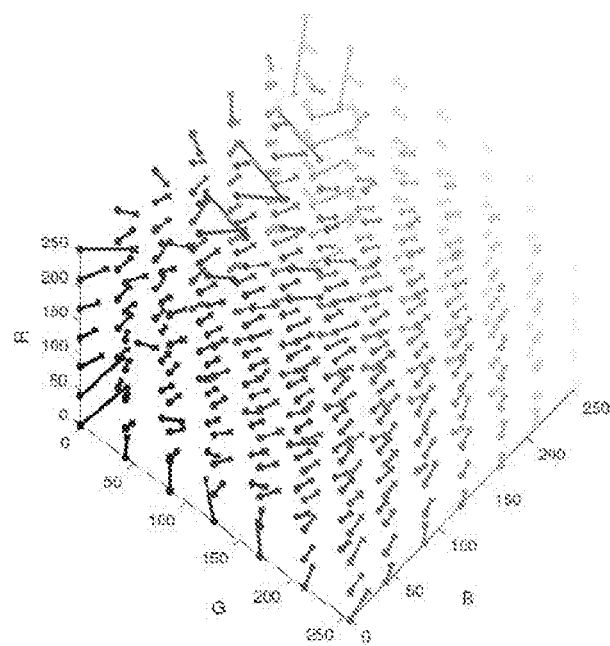
FIG. 7 is a further visualization of an example color mapping.
Figure 8:
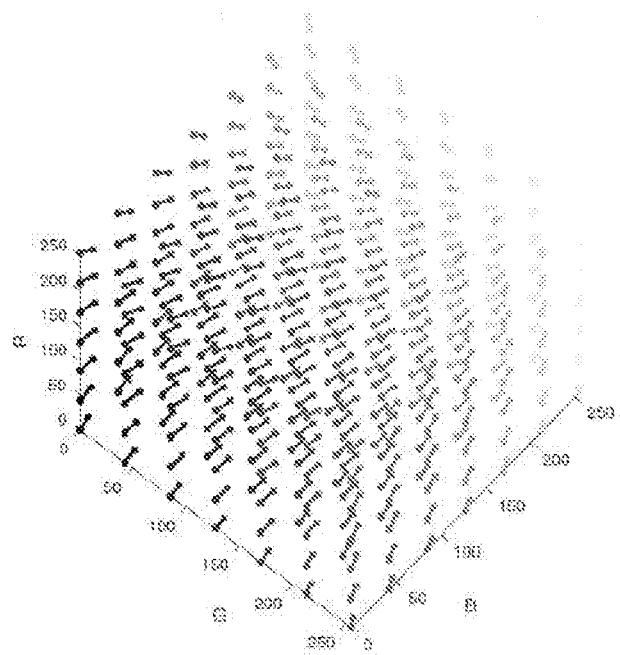
FIG. 8 is a visualization of an example smoothed mapping function determined using the color mapping of FIG. 7.
Figure 9:
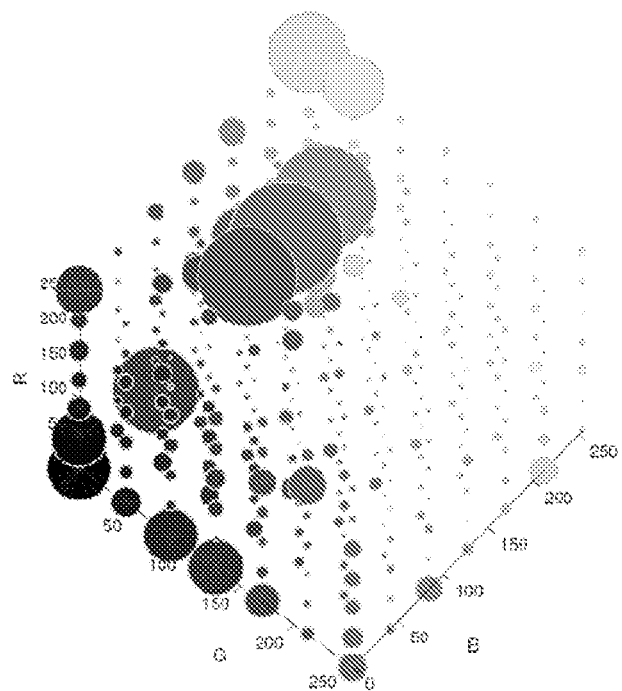
FIG. 9 is a visualization of individual errors between the example color mapping of FIG. 7 and the example smoothed mapping function of FIG. 8.

In FIG. 6, the individual errors are relatively small. However, in other examples, the individual errors may be larger. This may be indicative that the color mapping or the output of the smoothed mapping function as applied to the color input points may be unreliable for those color input and output points. FIGS. 7 to 9 show such an example.

FIG. 7 illustrates a further example of a color mapping. The color mapping of FIG. 7 is similar to that of FIG. 4 and is also shown in the RGB color space. However, unlike the color mapping of Figure, some color input points are transformed by a large amount with the color mapping of FIG. 7.

FIG. 8 shows the smoothed mapping function obtained from the color mapping of FIG. 7, which is obtained using the same method as that described for FIG. 5. FIG. 9 shows the individual errors calculated during the determination of the smoothed mapping function of FIG. 8. As can be seen from a comparison of FIG. 9 and FIG. 6, in FIG. 9 some of the errors are considerably larger than those of FIG. 6, represented by larger circular points. The color input points corresponding to these large errors may be considered to be outliers, which are not mapped or modeled well by the color mapping. These color input points may correspond to points for which the measured color mapping is incorrect, for example due to noise or systematic errors occurring during the measurement process.

To reduce the effect of these erroneous points, the mapping error between the smoothed mapping function and the color mapping may be evaluated using a subset of the first set of color input points that excludes color input points that do not satisfy a predetermined error condition in examples of the method. For example, the color input points of FIG. 6 may be analyzed to remove outliers before determining the smoothed mapping function.

The predetermined error condition may be based on the individual errors for the filter mapping function for the respective color input points. For example, the predetermined error condition may be satisfied by color input points whose individual errors for the filter mapping function have a magnitude less than a predetermined magnitude. The predetermined magnitude may be determined empirically. For example, the predetermined magnitude may be selected to correspond to a threshold above which changes in the RGB value are perceptually visible to an observer. This threshold may be assessed by determining the colorimetry of various different RGB points to determine the distance between the RGB points (sometimes referred to as ΔE), which may be determined in a perceptually relevant domain such as the CIELAB domain. Changes in RGB value corresponding to a ΔE level higher than that considered to be perceptually visible may be considered to be outliers. Alternatively, a similar process may be performed in the RGB domain rather than the CIELAB domain.

In other examples, in which the first set of n-dimensional color input points are in a color space, the predetermined error condition may be based on a respective location in the color space of the outputs of the filter mapping function as applied to the respective color input points. For example, the outputs of the filter mapping function as applied to the respective color input points may cover a region of the color space and the predetermined error condition may be satisfied by color input points with a location a predetermined distance from a perimeter of the region of the color space after application of the filter mapping function. In this way, the exclusion of color input points that are at an outer region of the color space can be avoided. This allows interpolation from these outer regions into inner regions of the color space to be used. In contrast, if color input points at the outer regions or extremities of the color space are excluded, it may be useful to extrapolate beyond the distribution of color input points used for deriving the smoothed mapping function. This may reduce the accuracy of the smoothed mapping function. For example, the smoothed mapping function may not capture the color mapping accurately in these outer regions, if no color input points were present in this region during the derivation of the smoothed mapping function.

To exclude certain color input points in this way, the method in examples may further include, before determining the smoothed mapping function, determining a filter mapping function of color input points that satisfies a first predetermined optimization condition based on a first mapping error between the filter mapping function and the color mapping. The first mapping error may be a function of individual errors between outputs of the filter mapping function as applied to respective color input points in the first set of color input points and corresponding color output points from the second set of color output points as mapped from the respective color input points by the color mapping. The predetermined optimization condition and the mapping error referred to above with reference to FIG. 3 may be, respectively, a second predetermined optimization condition and a second mapping error. The second mapping error in this example may be evaluated between the smoothed mapping function and the color mapping using a subset of the first set of color input points that excludes color input points that do not satisfy a predetermined error condition based on the outputs of the filter mapping function as applied to the respective color input data points. The fitter mapping function may be determined similarly to determining the smoothed mapping function, for example using a least squares regression function. Indeed, the filter mapping function may be of the same type or category as the smoothed mapping function, for example a polynomial, e.g. a second order polynomial. The first predetermined optimization condition may also be the same as the second predetermined optimization condition. For example, both of these optimization conditions may be satisfied by functions that minimize the mapping error, based on least squares regression.

For example, the filter mapping function may be a function $f(C_I)$ that operates on a set of input color points $C_I$ in a color mapping. These input color points may be tristimulus values (e.g. have an R, G and B variable value on a set scale). The predetermined error condition may be that the error between the filter mapping function applied to a given input color point $C_{Ii}$ and an output color point $C_{Oi}$ corresponding to the given input color point in the mapping is above a predetermined threshold, e.g. $\|f(C_{Ii})-C_{Oi}\|^2>T$. Determining the filter mapping function may comprise selecting or computing a function $f(C_I)$ that minimizes the error $\|f(C_{Ii})-C_{Oi}\|^2$ across the range of input color points in the color mapping (e.g. for a set of nodes or entries in a color mapping look-up table). This may comprise an optimization using numerical methods. This may be performed using a set of optimization function libraries as embodied in computer program code and executed by a processor of a computing device. In this case, determining the smoothed mapping function may comprise filtering out the input color points that have an error greater than the predetermined threshold, and then re-computing the function $f(C_I)$ using the remaining subset of input color points (i.e. those that have an error less than and/or equal to a predetermined threshold). In certain cases, this may comprise executing the same set of optimization computer program code but applied to a smaller dataset.

By excluding outliers in this way, the smoothed mapping function may more accurately represent the mapping to calibrate the printing system, for example to transform color input points to color output points that closely match desired outputs.

Figure 10:
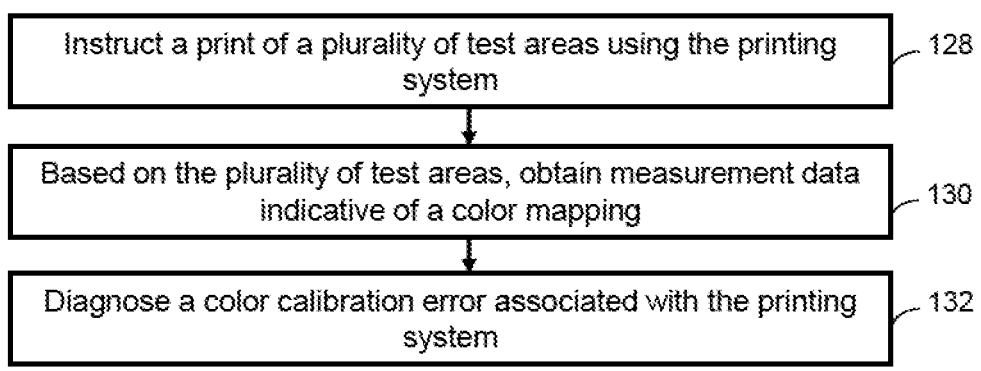
FIG. 10 is a flow diagram illustrating a method of diagnosing a color calibration error according to examples.
Figure 11:
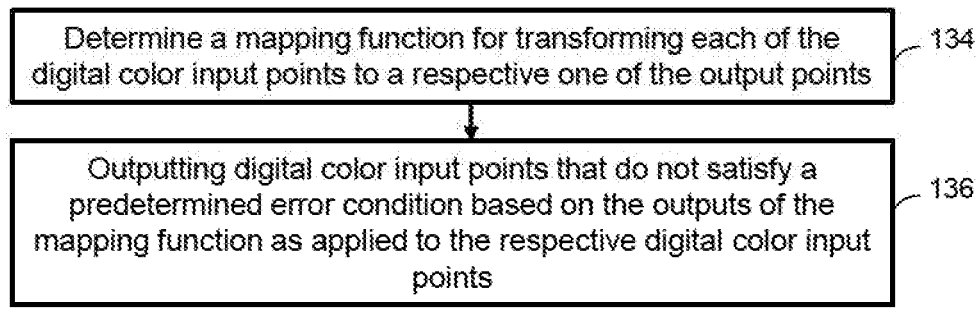
FIG. 11 is a flow diagram illustrating further operations for the method of diagnosing a color calibration error of FIG. 12.

Methods based on the principles described herein may also be used for diagnosing color calibration errors in a printing system. The flow charts of FIGS. 10 and 11 show such an example. The method of FIG. 10 includes, at block 128, instructing a print of a plurality of test areas using the printing system.

At block 130, based on the plurality of test areas, measurement data indicative of a color mapping that maps, in a color space, a respective one of digital color input points to a respective one of color output points is obtained. Each one of the color output points may be based on a respective measured color property. The color mapping may be obtained using the methods described with reference to obtaining the color mapping of block 122 of FIG. 3. The color space may be a device-dependent color space such as the RGB or CMYK spaces or a device-independent space such as an NPac space.

The method of FIG. 10 includes, at block 132, diagnosing a color calibration error associated with the printing system. The diagnosing of the color calibration error is shown in more detail in FIG. 11. The instructions of the methods of FIGS. 10 and 11 may be stored as instructions on a non-transitory machine readable which, when executed by a processor of the printing system, cause the processor to carry out the blocks of these Figures.

At block 134, the method of FIG. 11 includes determining a mapping function for transforming each of the digital color input points to a respective one of the output points, the mapping function satisfying a predetermined optimization condition based on a mapping error between the mapping function and the color mapping, the mapping error being a function of individual errors between outputs of the mapping function as applied to respective digital color input points and corresponding output points. The mapping function may be determined similarly to the determination of the smoothed mapping function described above with reference to FIGS. 3 to 6.

At block 136, the method of FIG. 11 includes outputting digital color input points that do not satisfy a predetermined error condition based on the outputs of the mapping function as applied to the respective digital color input points. By outputting these digital color input points, errors in the calibration process can be identified and addressed appropriately.

The predetermined error condition may be based on at least one of the individual errors for the mapping function for the respective digital color input points or a respective location in the color space of the outputs of the mapping function as applied to the respective digital color input points. For example, the predetermined error condition may be similar to that described with reference to FIGS. 6 to 9.

FIG. 12 is a schematic illustration showing a printing system according to examples. The printing system 200 of FIG. 12 may be similar to the printing system 100 of FIG. 1. Features of the printing system 200 of FIG. 12 similar to corresponding features of FIGS. 1 and 2 are labelled with the same reference numerals but incremented by 100; corresponding descriptions are to be taken to apply. The printing system 200 includes a printing device 206 to print a plurality of base color inks. The printing device 206 includes a deposit mechanism 238 to deposit drops of base color ink having a defined drop weight onto a print substrate. The deposit mechanism 238 for example includes an inkjet printer head or nozzle. The printing device 206 also includes a print controller 240 to receive print job data and a memory 242. The memory 242 may include at least one of volatile memory, such as a random access memory (RAM) and non-volatile memory, such as read-only memory (ROM) or a solid state drive (SSD) such as Flash memory. The memory 242 in examples may include further storage devices, for example magnetic, optical or tape media, compact disc (CD), digital versatile disc (DVD) or other data storage media. The memory 242 may be removable or non-removable from the printing system 200. The printing device 206 may include the memory 242. The memory 242 includes a color-mapping look-up table 216 to map a first set of n-dimensional color input points to a correspond second set of n-dimensional color output points, the color-mapping look-up table representing a measured behavior of the printing system. The memory 242 also includes print job data 212 and a calibrated color-mapping look-up table 214.

In the example of FIG. 12, the memory 242 also includes a color calibrator 244. The color calibrator 244 is arranged to determine a smoothed mapping function of color input points that satisfy a predetermined optimization condition based on a mapping error between the smoothed mapping function and entries of the color-mapping look-up table 216. The mapping error may be a function of individual errors between outputs of the smoothed mapping function as applied to respective color input points in the first set of color input points and corresponding color output points from the second set of color output points as mapped from the respective color input points by the color-mapping look-up table 216. The color calibrator 244 is further arranged to generate the calibrated color-mapping look-up table 214 based on the smoothed mapping function. In examples, the color-mapping look-up table 216 may be replaced by the calibrated color-mapping look-up table 214, although in other examples both the color-mapping look-up table 216 and the calibrated color-mapping look-up table 214 may be stored in the memory 242. The print controller 240 is configured to use the calibrated color-mapping look-up table 214 to print the print job data 212 using the printing device 206.

In the example of FIG. 12, the printing system 200 further includes a processor 246, which is communicatively coupled to the memory 242. The processor 246 in FIG. 12 may be a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The color calibrator 244 may be in the form of computer program instructions, which may implement the color calibrator 244 when processed by the processor 246. In other examples, the color calibrator 244 may itself be in the form of a processor or a microprocessor. The components of the printing system 200 in the example of FIG. 12 are interconnected using a systems bus 248. This allows data to be transferred between the various components.

Certain methods and systems as described herein, such as the printing system 200 of FIG. 12, may be implemented by a processor that processes computer program code that is retrieved from a non-transitory machine readable medium. A further example of such a system is illustrated in FIG. 13. The printing system 300 of FIG. 13 includes a non-transitory machine readable medium 350 coupled to a processor 346, which may be similar to the processor 246 of FIG. 13. In examples the printing system 300 includes a printing device (not shown). The non-transitory machine readable media 350 can be any media that can contain, store, or maintain programs and data for use by or in connection with an instruction execution system. Machine readable media can include any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In FIG. 13, the non-transitory machine readable medium 350 includes instructions (not shown) which, when executed by a processor 350 of a printing system, cause the processor 350 to implement any of the methods described above.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of calibrating a printing system, comprising:
obtaining data defining a color mapping that maps a first set of n-dimensional color input points to a corresponding second set of n-dimensional color output points, the color mapping representing a measured behavior of the printing system;
determining a filter mapping function of color input points that satisfies a first predetermined optimization condition based on a first mapping error between the filter mapping function and the color mapping, the first mapping error being a function of individual errors between:
outputs of the filter mapping function as applied to respective color input points in the first set of color input points; and
corresponding color output points from the second set of color output points as mapped from the respective color input points by the color mapping;
determining a smoothed mapping function of color input points that satisfies a second predetermined optimization condition based on a second mapping error between the smoothed mapping function and the color mapping, the second mapping error being a function of individual errors between:
outputs of the smoothed mapping function as applied to respective color input points in the first set of color input points; and
corresponding color output points from the second set of color output points as mapped from the respective color input points by the color mapping,
wherein the second predetermined optimization condition is a third predetermined optimization condition and the second mapping error is a third mapping error, the third mapping error between the smoothed mapping function and the color mapping being evaluated using a subset of the first set of color input points that excludes color input points that do not satisfy a predetermined error condition based on the outputs of the filter mapping function as applied to the respective color input data points, wherein the smoothed mapping function is used to calibrate the printing system.

2. The method of claim 1, wherein the second mapping error between the smoothed mapping function and the color mapping is evaluated using a subset of the first set of color input points that excludes color input points that do not satisfy a predetermined error condition.

3. The method of claim 1, wherein the predetermined error condition is based on the individual errors for the filter mapping function for the respective color input points.

4. The method of claim 3, wherein the predetermined error condition is satisfied by color input points whose individual errors for the filter mapping function have a magnitude less than a predetermined magnitude.

5. The method of claim 1, wherein the first set of n-dimensional color input points are in a color space, and the predetermined error condition is based on a respective location in the color space of the outputs of the filter mapping function as applied to the respective color input points.

6. The method of claim 5, wherein the outputs of the filter mapping function as applied to the respective color input points cover a region of the color space, the predetermined error condition being satisfied by color input points with a location a predetermined distance from a perimeter of the region of the color space after application of the filter mapping function.

7. The method of claim 1, wherein the first predetermined optimization condition is the same as the third predetermined optimization condition.

8. The method of claim 1, wherein the first set of n-dimensional color input points are in the same color space as the second set of n-dimensional color output points.

9. The method of claim 1, wherein the second predetermined optimization condition is satisfied by a mapping error with a magnitude less than a predetermined magnitude or by a minimization of the mapping error.

10. The method of claim 1, wherein the smoothed mapping function is a polynomial function.

11. The method of claim 1, wherein the determining the smoothed mapping function of color input points that satisfies the second predetermined optimization condition comprises interpolation or regression.

12. A printing system comprising:
a printing device to print a plurality of inks;
 a print controller to receive print job data; and
 a memory comprising:
  a color-mapping look-up table to map a first set of n-dimensional color input points to a corresponding second set of n-dimensional color output points, the color-mapping look-up table representing a measured behavior of the printing system; and
 a color calibrator to:
 determine a filter mapping function of color input points that satisfies a first predetermined optimization condition based on a first mapping error between the filter mapping function and the color mapping, the first mapping error being a function of individual errors between:
outputs of the filter mapping function as applied to respective color input points in the first set of color input points; and
corresponding color output points from the second set of color output points as mapped from the respective color input points by the color mapping;
 determine a smoothed mapping function of color input points that satisfy a second predetermined optimization condition based on a second mapping error between the smoothed mapping function and entries of the color-mapping look-up table, the second mapping error being a function of individual errors between:
outputs of the smoothed mapping function as applied to respective color input points in the first set of color input points; and
corresponding color output points from the second set of color output points as mapped from the respective color input points by the color-mapping look-up table; and
generate a calibrated color-mapping look-up table based on the smoothed mapping function,
wherein the second predetermined optimization condition is a third predetermined optimization condition and the second mapping error is a third mapping error, the third mapping error between the smoothed mapping function and the color mapping being evaluated using a subset of the first set of color input points that excludes color input points that do not satisfy a predetermined error condition based on the outputs of the filter mapping function as applied to the respective color input data points,
wherein the print controller is configured to use the calibrated color-mapping look-up table to print the print job data using the printing device.

\* \* \* \* \*